United States Patent
Huang

(10) Patent No.: US 7,984,799 B2
(45) Date of Patent: Jul. 26, 2011

(54) REEL DEVICE OF DIVERSION JOINT

(75) Inventor: Hsu-Jui Huang, Taipei (TW)

(73) Assignee: Bestfon Technology Corp. (TW)

( * ) Notice: Subject to any disclaimer, the term of this patent is extended or adjusted under 35 U.S.C. 154(b) by 338 days.

(21) Appl. No.: 12/288,978

(22) Filed: Oct. 24, 2008

(65) Prior Publication Data
US 2009/0107789 A1    Apr. 30, 2009

(51) Int. Cl.
*H02G 11/00* (2006.01)
(52) U.S. Cl. .................................. 191/12.2 R
(58) Field of Classification Search ........... 191/12 R, 191/12.2 R, 12.4; 242/385, 385.1, 385.2, 242/385.3, 371, 378, 378.1, 378.2, 378.3, 242/395, 398, 405, 405.1, 283; 439/501, 439/4; 188/82.1, 82.2, 82.3, 82.4, 82.7, 82.8
See application file for complete search history.

(56) References Cited

U.S. PATENT DOCUMENTS
2005/0236243 A1 * 10/2005 Huang ................. 191/12.4
* cited by examiner

*Primary Examiner* — Mark T Le

(57) ABSTRACT

A reel device of diversion joint comprises: a casing, a wire holder, a telegraph line, a position plate and two L-shape anchors. The casing has a shaft and a restraint cavity. The wire holder is located on the shaft. The telegraph line is winded inside the wire holder. The position plate located on the wire holder has a guiding groove and at least one anchor recess. Two L-shape anchors located on the guiding groove are separated to two sides of the shaft, and each of the L-shape anchors has a slider protrusion to slide along the guiding groove. When the joint performs a linear motion, the wire holder drives the shaft to rotate and the slider protrusion slides along the guiding groove. When the linear motion stops, the joint is fixed on a position where the slider protrusion is anchored in the anchor recess.

1 Claim, 7 Drawing Sheets

REEL DEVICE OF DIVERSION JOINT

BACKGROUND OF INVENTION

1. Field of the Invention

The present invention relates to a reel device of diversion joint, and more particularly to the reel device whose telegraph line can be pulled and collected.

2. Description of the Prior Art

To change with each passing day, a personal computer is popular and Computer, Communication, and Consumer Electronics are advanced by adjusting the different peripheral equipments such as different standards of joints and signal lines. Since Window 98, an USB (Universal Serial Bus) is a new transmission data interface. Particularly, the businessman or traveler usually needs two different specification joints for extending a signal line. How the users reserve the joint for the signal lines is the problem.

For solving the above-mentioned problem, a telegraph line has been developed for a reel-shaft box structure, in which the reel-shaft box structure has a shell, a telegraph line, a spiral spring, and also the signal lines, and the peripheral telegraph part. The inside signal line is stored via a reverse mechanism and extends to connect a joint of the shell. While the inside signal line is rotated, it keeps contacting with the shell. The signal line is directly to extend outside by a pull position-restored mechanism. The outside of signal line can be pulled by the spiral spring of the pull position-restored mechanism to extend an appropriate length. For finishing, the pull position-restored mechanism to release the telegraphy lines part can roll up automatically.

In view of the shortcomings of the prior art, the inventor of the present invention based on years of experience in the antenna field to conduct experiments and modifications develops a reel device of diversion joint to overcome the foregoing shortcomings.

SUMMARY OF INVENTION

The primary objective of the present invention is to provide a reel device of diversion joint to improve the joint having a linear movement. A wire holder is to perform a rotating movement of a shaft, and a shape of a conduct joint is particularly defined to carry out movement and positioning for reaching the speed to roll up the reel device.

The reel device of diversion joint comprises: a casing, a wire holder, a telegraph line, a position plate and two L-shape anchors. The casing has a shaft and a restraint cavity. The wire holder is located on said shaft. The telegraph line has at least a terminal at one end, and a part of said telegraph line is to circulate inside said wire holder. The position plate is located on said wire holder, and has a guiding groove and at least one anchor recess. Each of the two L-shape anchors has one slider protrusion extending downward to be sled along the guiding groove. When said terminal is pulled to proceed a linear motion, said wire holder drives said shaft to rotate till said joint reaches a state when the pulling upon the terminal is off and said slider protrusion is located in the anchor recess.

To make it easier for our examiner to understand the objective of the invention, its structure, innovative features, and performance, we use preferred embodiments together with the attached drawings for the detailed description of the invention.

DETAILED DESCRIPTION

Figure 1A:
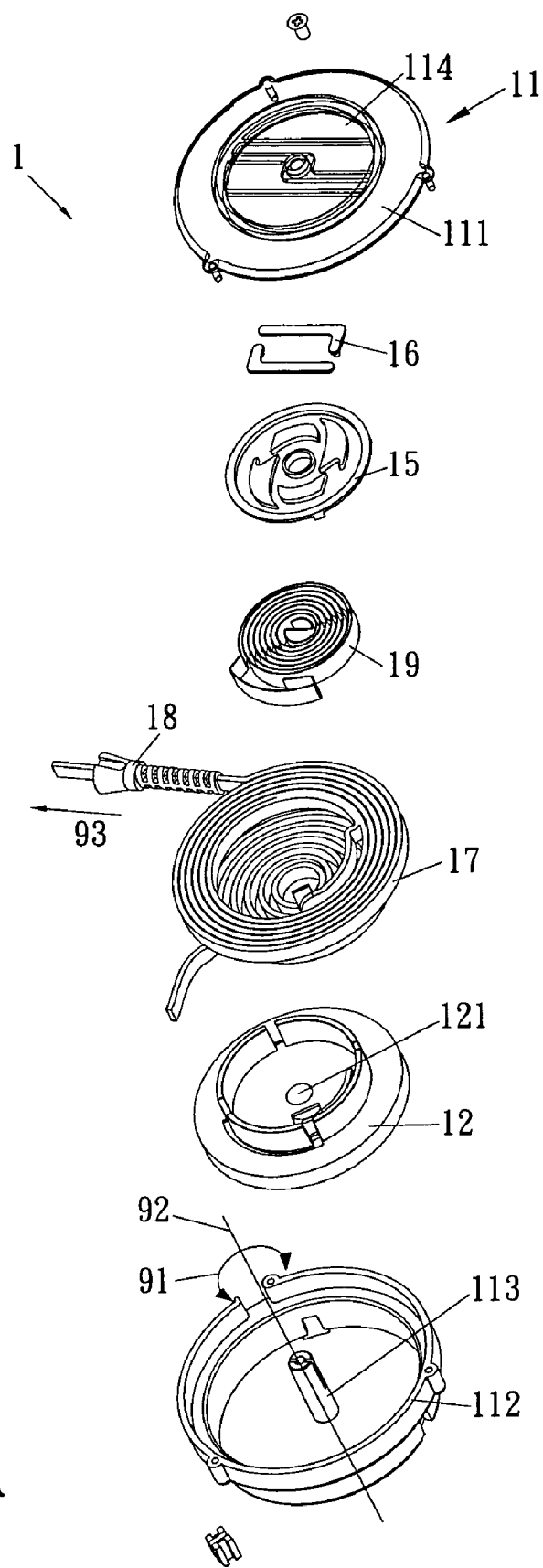
FIG. 1A is an exploded view of a reel device of diversion joint in accordance with the present invention.

In the related figures of a preferred embodiment, the same referring numerals are used for the same components of an input apparatus in accordance with the present invention.

Refer to 1A and 1B for an exploded view and an assembly view of a reel device of diversion joint in accordance with the present invention. Our reel device of diversion joint comprises: a casing 11, a wire holder 12, a telegraph line 17, a position plate 15 and at least an L-shape anchor 16. The casing 11 has an upper casing 111 and a lower casing 112, and also the lower casing 112 has a shaft 113. The wire holder 12 is mounted on the lower casing 112, the edge of the surface of the wire holder 12 is almost parallel to an extend direction 92 of the shaft 113. The wire holder 12 has a shaft hole 121 for the shaft 113 to penetrate therethrough. The wire holder 12 is to rotate about the shaft 113. The casing 11 has a restraint cavity 114 for accommodating the L-shape anchors 16 thereinside between the upper casing 111 and the position plate 15. The L-shape anchor 16 located inside the restraint cavity 114 is to allow a one-way clutching of the device. The telegraph line 17 has at least a terminal 18 and a winding structure 19 for the telegraph line 17 to be winded therealong. The winding structure 19 is located in the wire holder 12. Therefore, the telegraph line 17 can be located in the wire holder 12, and a portion of telegraph part 17 is close to the edge surface of the wire holder 12.

Figure 2:
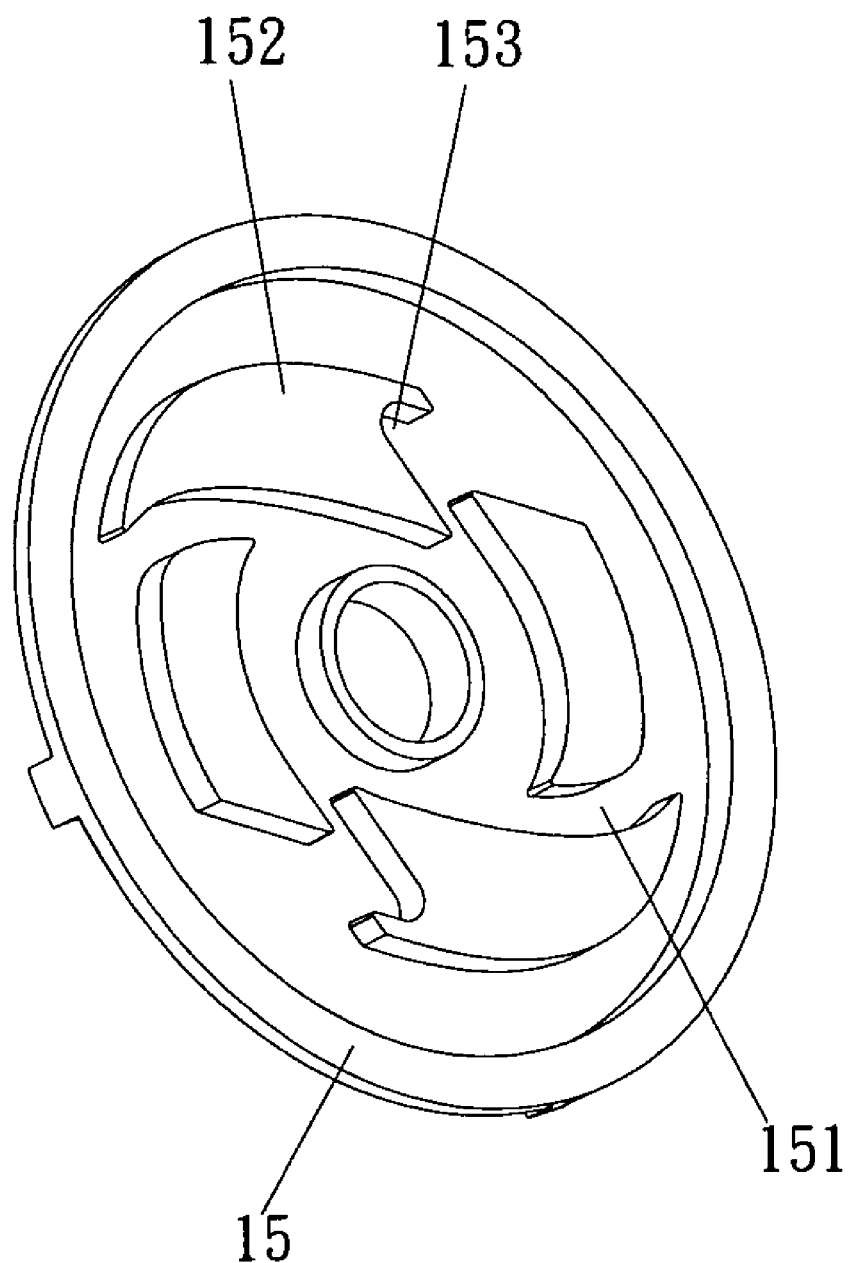
FIG. 2 is a schematic view of the position plate of FIG. 1A.

Refer to FIG. 2 for a schematic view of the position plate 15 of FIG. 1A. The position plate 15 is located on the wire holder 12 as well as on the winding structure 19. The position plate 15 has a guiding groove 151 with a predetermined shape. The guiding groove 151 is spirally extended on a surface almost perpendicular to the shaft 113 and is formed by four structural islands 152 protruding toward the upper casing 111 on the position plate 15. The four protruding structural islands 152 are symmetrically designed, and two opposing structural islands 152 have corresponding anchor recesses 153 communicated in space with the guiding groove 151.

Figure 1B:
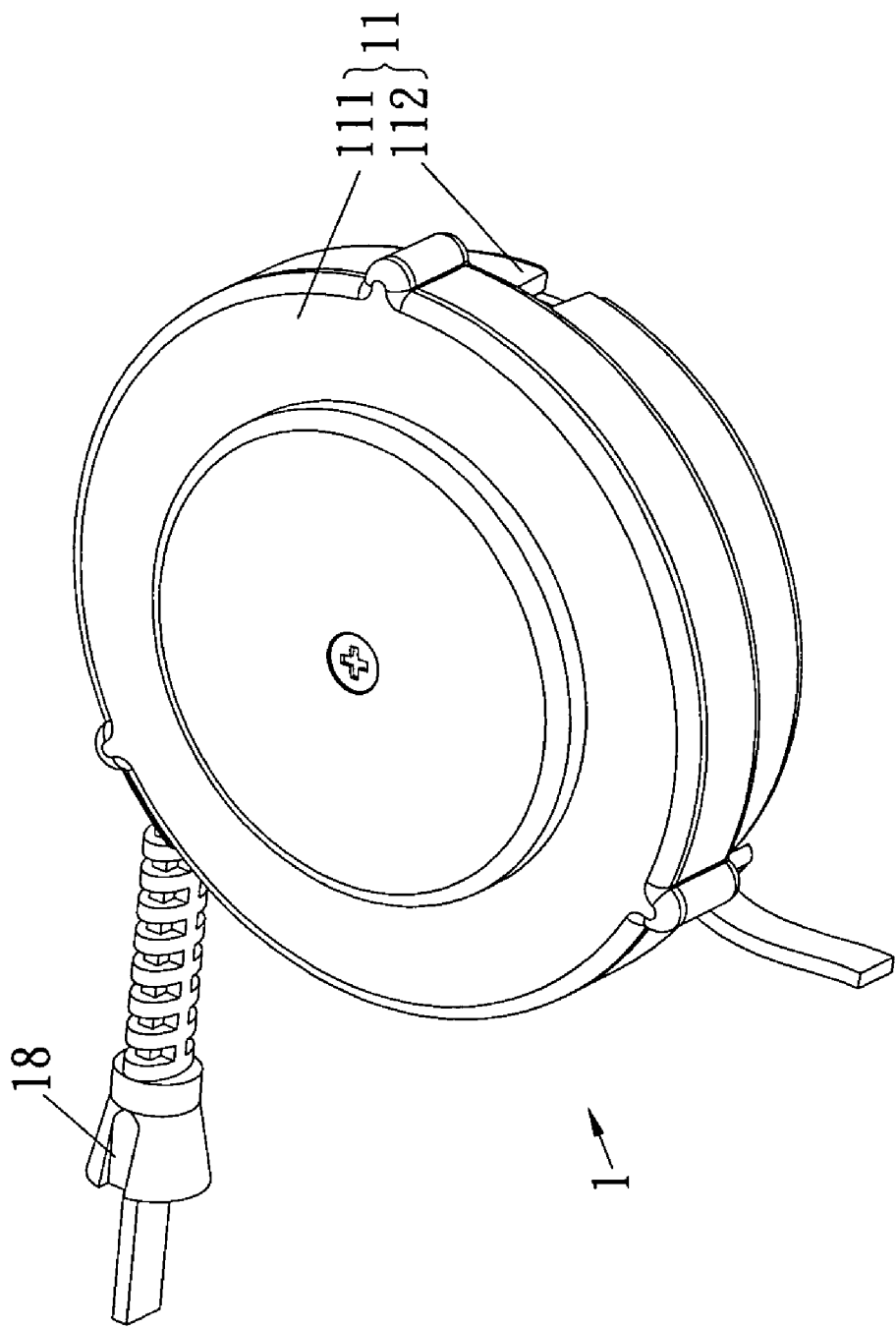
FIG. 1B is an assembly view of FIG. 1A.
Figure 3:
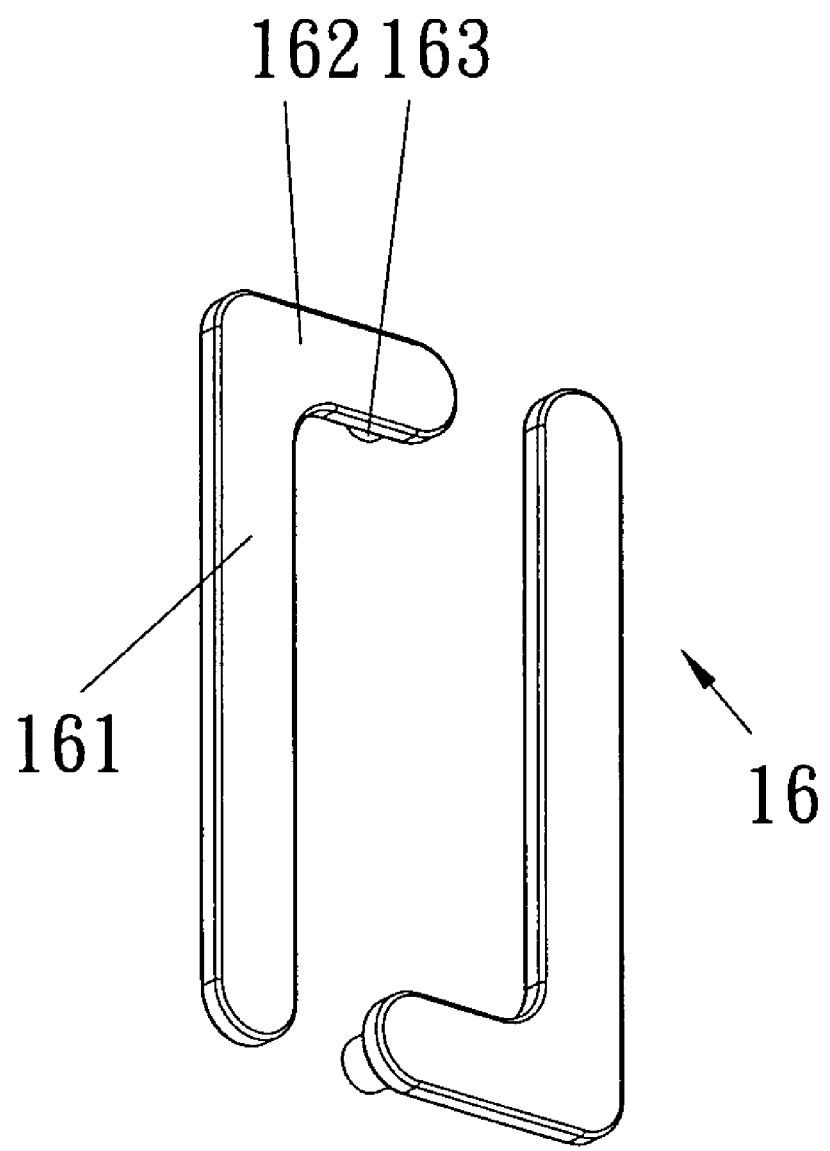
FIG. 3 is a schematic view of the pair of the L-shape anchors of FIG. 1A.

Refer to FIG. 3 for a schematic view of a pair of the L-shape anchors 16 of FIG. 1A. The L-shape anchor 16 located and moving between the upper casing 111 and the position plate 15 within the restraint cavity 114 has a long-length leg 161 and a short-length leg 162. The long-length leg 161 and the short-length leg 162 are perpendicular. The L-shape anchor 16 has a slider protrusion 163 located close to a free end of the short-length leg 162. The slider protrusion 163 is to slide along the guiding groove 151 and to anchor in the corresponding anchor recess 153 of the position plate 15. The long-length leg 161 is to move freely between the upper casing 111 and the position plate 15 and to be restrained within the restraint cavity 114. As shown in FIG. 1, two L-shape anchors 16 are paired to a bracket formulation and are set to two sides of the shaft 113 symmetrically.

Figure 4:
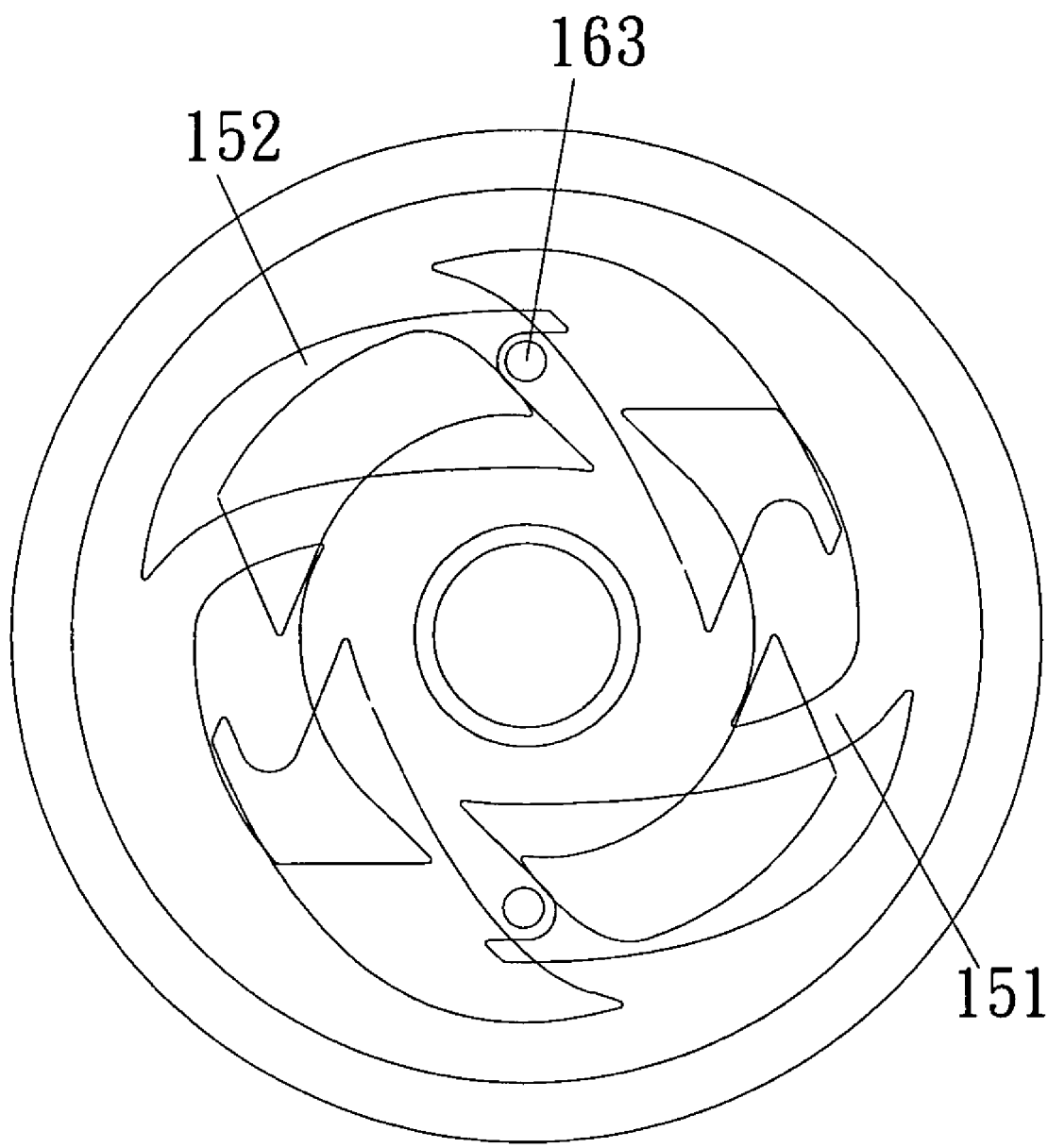
FIG. 4 shows an engagement state of the position plate of FIG. 2 and the L-shape anchors of FIG. 3.

Refer to FIG. 4 for an engagement state of the position plate 15 of FIG. 2 and the L-shape anchors 16 of FIG. 3. In the present invention, the terminal 18 has a linear movement 93 and a rotational movement 91 about the shaft 113 following the linear movement 91. By initiating the linear movement 93 as well as the rotational movement 91 of the telegraph line 17, the two slider protrusions 163 are pulled away from the corresponding anchor recesses 153 and enter inwards to slide along the guiding groove 151 about the shaft 113. While the pulling on the telegraph line 17 is off, the slider protrusions 163 would slide backwards and outwards a little bit along the guiding groove 151 to nest into the close anchor recesses 153.

Figure 5:
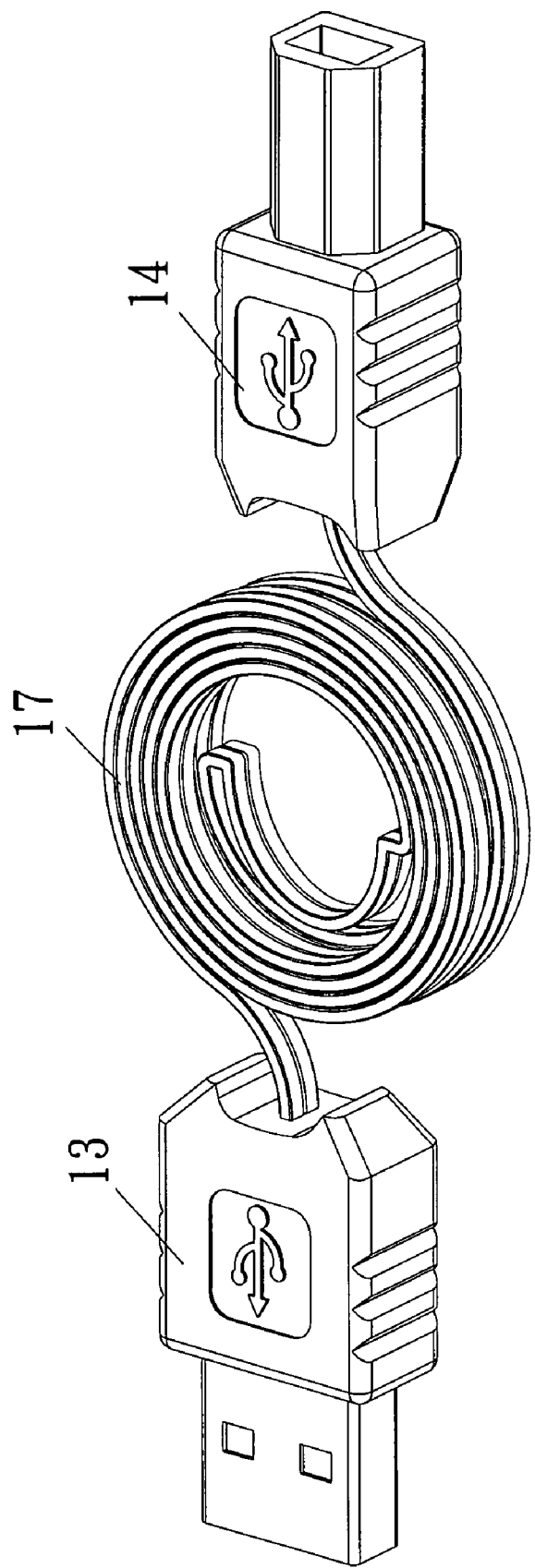
FIG. 5 is a schematic view of another embodiment of the telegraph line in accordance with the present invention.

Refer to FIG. 5 for a schematic view of another embodiment of the telegraph line 17 in accordance with the present invention. It is shown that the telegraph line 17 has a first terminal 13 at one end and a second terminal 14 at another end. The first terminal 13 and the second terminal 14 may have different specifications; a male terminal and a female terminal. The first terminal 13 and the second terminal 14 may have the same specification; two male terminals or two female terminals.

Figure 6:
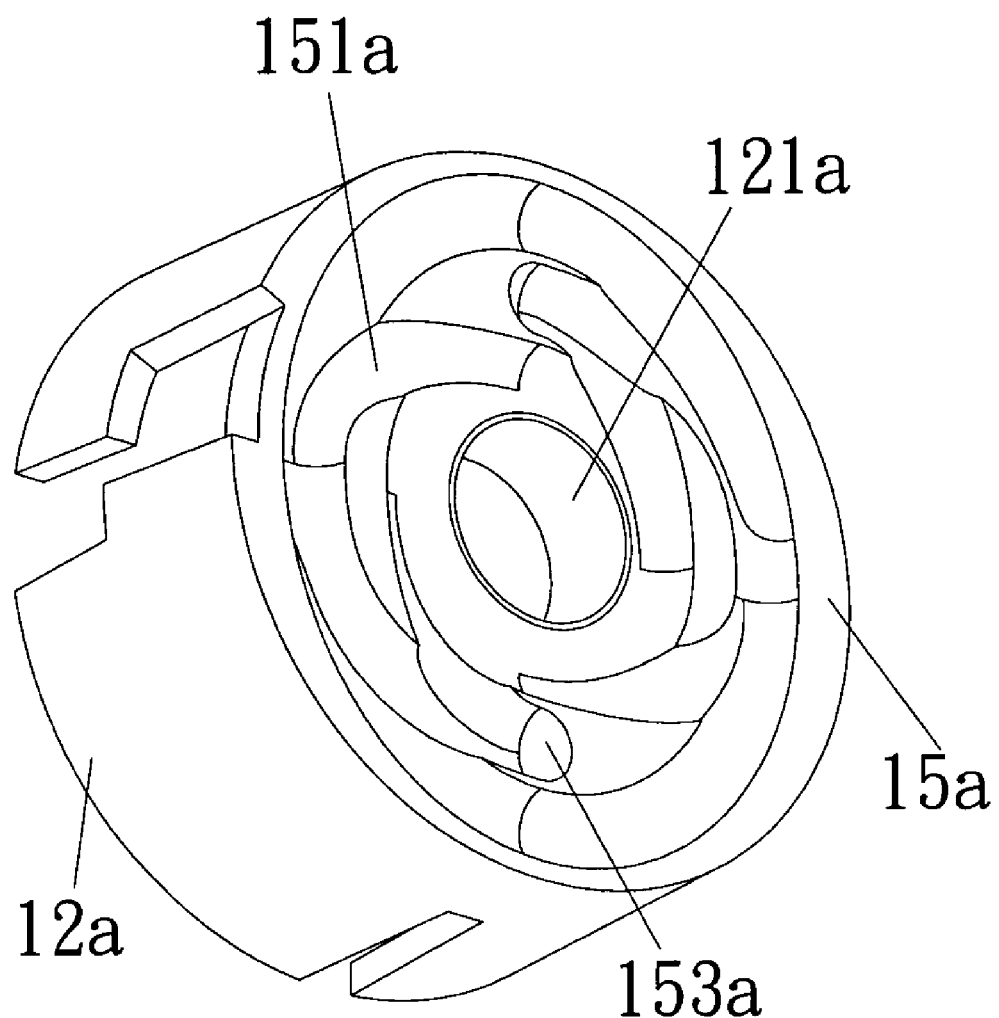
FIG. 6 is a schematic view of another embodiment of a wire holder and a position plate in accordance with the present invention.

Refer to FIG. 6 for a schematic view of another embodiment of a wire holder and a position plate. The guiding groove 151a is a three-dimensional curve shape. The wire holder 12a and the position plate 15a are integrated into a unique piece, the shaft hole 121a is located on the position plate 15a, and the wire holder 12a is the shaft body (not-shown) for processing a rotational movement.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reel device of diversion joint, comprising:
   a casing, further including an upper casing and a lower casing to match the upper casing, the upper casing having a restraint cavity facing the lower casing, the lower casing having a central shaft extending toward the restraint cavity;
   a wire holder, mounted on the lower casing, further having a shaft hole for the shaft to penetrate therethrough;
   a telegraph line, mounted inside the wire holder in a winding manner, having a terminal at one end thereof extending out of the casing;
   a position plate, located in the restraint cavity and between the upper casing and the telegraph line, further having a guiding groove and four separate structural islands protruding toward the upper casing to shape the guiding groove, wherein a pair of the structural islands opposing to each other have individual anchor recesses communicated in space with the guiding groove; and
   a pair of L-shape anchors, located and moving between the upper casing and the position plate within the restraint cavity, each of the L-shape anchors further having a long-length leg and a short-length leg perpendicular to the long-length leg, the short-length leg further having a slider protrusion extending downward to slide along the guiding groove and able to anchor in any of the anchor recesses;
   wherein, by initiating a linear movement at the terminal of the telegraph line, the slider protrusion is pulled away from a corresponding one of the anchor recesses and enter inwards to slide along the guiding groove about the shaft;
   wherein, when pulling on the terminal of the telegraph line is off, the slider protrusion slides backwards and outwards along the guiding groove to anchor into a nearby one of the anchor recesses.

\* \* \* \* \*